(12) United States Patent
Gustafson et al.

(10) Patent No.: US 8,056,935 B2
(45) Date of Patent: Nov. 15, 2011

(54) INTERFACE BETWEEN A STIFF PIECE AND A COMPOSITE MATERIAL, A METHOD FOR THE FORMATION OF SUCH AN INTERFACE AND A STIFF PIECE THEREFORE

(76) Inventors: Claes-Goran Gustafson, Varmdo (SE); Nils-Petter Vedvik, Ranheim (NO)

( * ) Notice: Subject to any disclaimer, the term of this patent is extended or adjusted under 35 U.S.C. 154(b) by 239 days.

(21) Appl. No.: 12/308,454

(22) PCT Filed: Jun. 15, 2007

(86) PCT No.: PCT/NO2007/000212
§ 371 (c)(1),
(2), (4) Date: Feb. 26, 2009

(87) PCT Pub. No.: WO2007/145533
PCT Pub. Date: Dec. 21, 2007

(65) Prior Publication Data
US 2010/0059992 A1    Mar. 11, 2010

(30) Foreign Application Priority Data
Jun. 16, 2006 (NO) .................................. 20062841

(51) Int. Cl.
*F16L 33/00* (2006.01)
(52) U.S. Cl. ................ 285/290.1; 285/290.3; 285/222.1
(58) Field of Classification Search ............... 285/290.1, 285/290.2, 290.3, 290.4, 222; 138/129
See application file for complete search history.

(56) References Cited

U.S. PATENT DOCUMENTS

| | | | | |
|---|---|---|---|---|
| 1,847,218 A | * | 3/1932 | Lamb ........................ | 285/222.3 |
| 2,277,397 A | * | 3/1942 | Graham .................... | 285/222.4 |
| 2,915,323 A | * | 12/1959 | Cullen et al. ............... | 285/222.5 |
| 3,508,768 A | * | 4/1970 | Hogan ....................... | 285/222.2 |
| 3,799,587 A | * | 3/1974 | Chevalier et al. .......... | 285/222.1 |
| 4,126,157 A | * | 11/1978 | Roest ......................... | 285/222.3 |
| 4,234,019 A | * | 11/1980 | Hornor et al. .............. | 285/222.2 |
| 5,160,392 A | | 11/1992 | Thongs, Jr. | |
| 5,327,963 A | | 7/1994 | Vance, Sr. | |
| 5,702,109 A | | 12/1997 | Mahin et al. | |
| 6,050,612 A | | 4/2000 | Wolterman | |

(Continued)

OTHER PUBLICATIONS

PCT Search Report & Written Opinion in PCT/NO2007/000212 dated Dec. 16, 2008.

*Primary Examiner* — David E Bochna
(74) *Attorney, Agent, or Firm* — Manelli Selter PLLC; Edward J. Stemberger

(57) ABSTRACT

An interface is provided between a stiff piece (1) and a composite material (2), the composite material (2) including fibres (3), the stiff piece (1) including two or more vanes (4a, 4b, . . . ) protruding from a surface of the stiff piece (1). The vanes (4) include two or more lateral surfaces (41, 42, 43, 44), in which one or more fibres (3) of the composite material (2) are arranged for passing through one or more funnel-shaped throats (45) formed between lateral surfaces (41a, 43a, 41b, 43b, . . . ) of adjacent vanes (4a, 4b, . . . ). A fixing matrix material (7) is arranged around the one or more fibres (3), at least in or near the funnel-shaped throats (45). The vanes (4) are arranged for exerting counteracting transversal and axial forces on the fibres (3) and the fixing matrix material (7) when the interface is subject to forces.

23 Claims, 9 Drawing Sheets

U.S. PATENT DOCUMENTS 6,676,169 B1    1/2004   Reynolds
6,742,813 B1    6/2004   Glejbol
7,303,213 B2 *  12/2007  Rytter .................. 285/222.1

2003/0067167 A1   4/2003   Massaria
2003/0107186 A1   6/2003   Salama

* cited by examiner

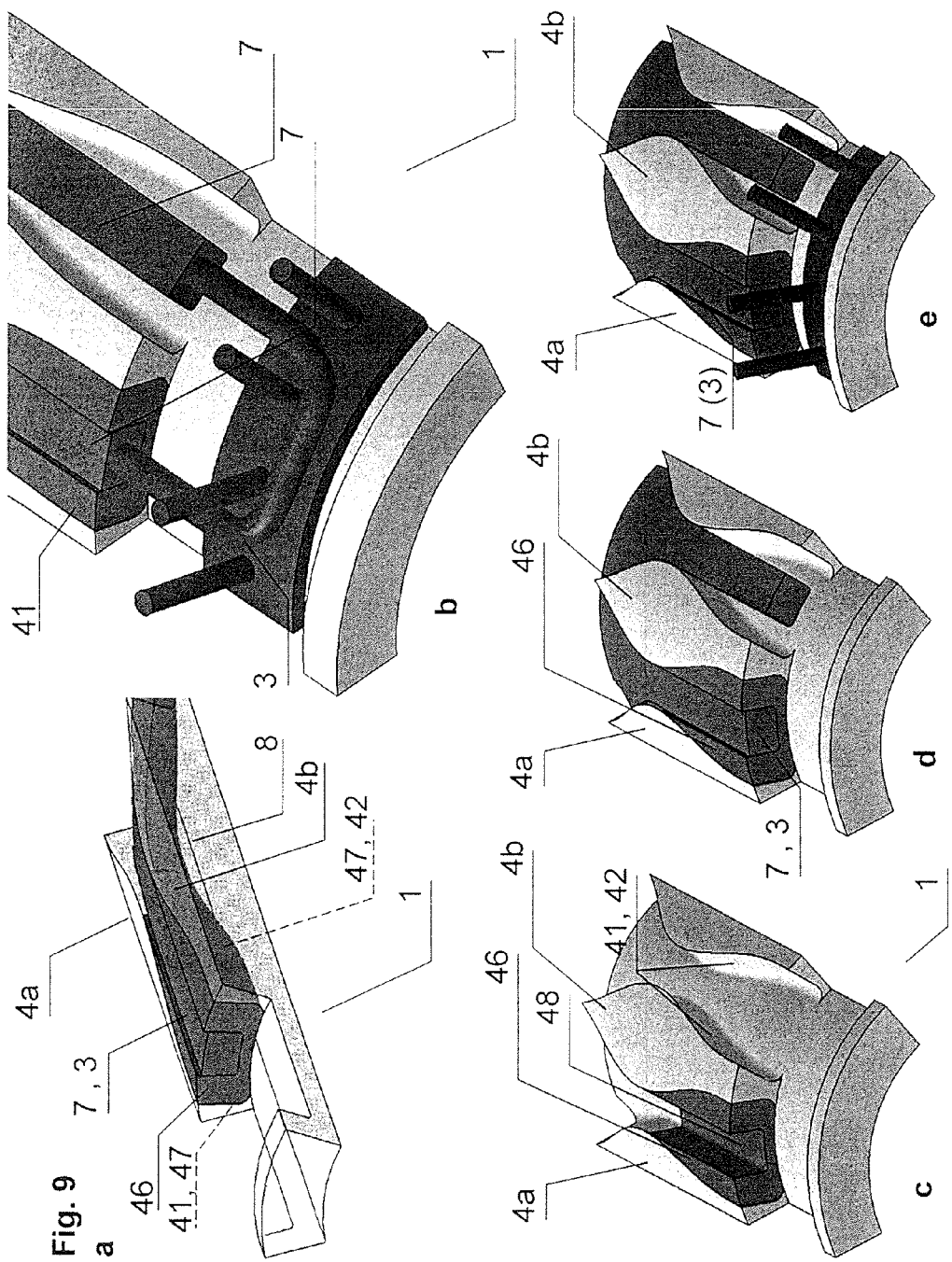

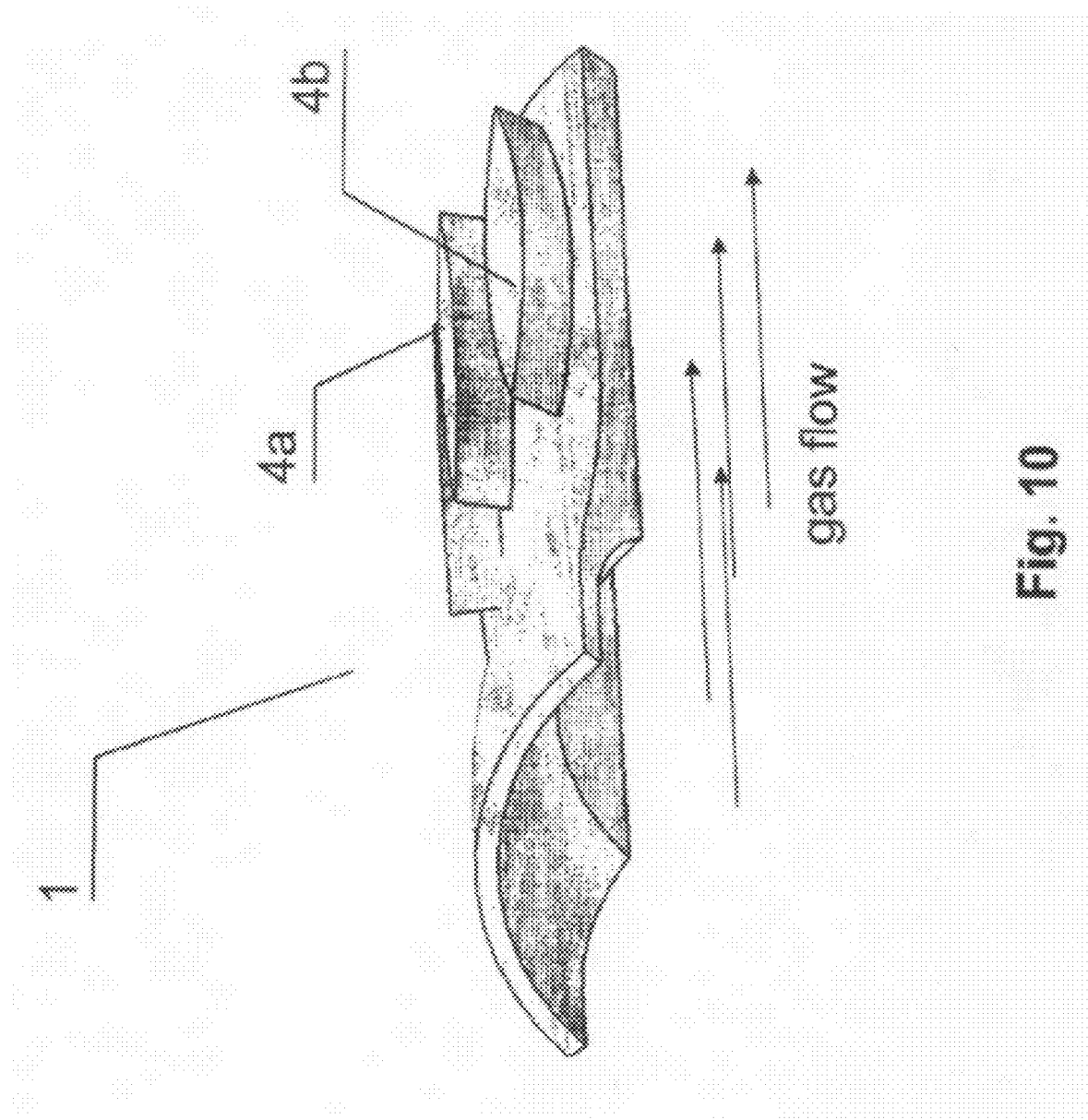

INTERFACE BETWEEN A STIFF PIECE AND A COMPOSITE MATERIAL, A METHOD FOR THE FORMATION OF SUCH AN INTERFACE AND A STIFF PIECE THEREFORE

The load transfer between a tubular or pipe comprising continuous fibres in a fibre reinforced composite material and a metallic end piece is of importance in many applications. One may mention the fields of pipe technology in which there is a need for fibre-reinforced composite risers, windmill blades or other fibre-reinforced composite structures. One of the major problems in fibre reinforcing a material is to terminate and securely attach the fibres passing from the fibre-reinforced layers to a stiff, often metallic end piece. If the attachment is not properly designed and manufactured there is a risk that the fibre bundles will slip out of the attachment and entire fibre layers will delaminate. If this occurs, a catastrophic failure will be the result. The present invention discloses a new and inventive method for such an attachment.

BACKGROUND OF THE INVENTION

Various solutions to the above problem have been proposed in the background art mostly comprising the use of so-called trap-lock joints or trap-lock metal composite interfaces (MCIs). When using a trap-lock MCI the common method of manufacture is filament-winding. Numerous textbooks on composite materials and technology describe filament-winding in detail. Here it is sufficient to state that filament-winding is a manufacturing process wherein resin impregnated fibre bundles (tows) are placed along geodetics in helical patterns on top of a mandrel or liner. After the filament-winding operation is finished the resin is cross-linked (cured). For a so-called riser joint, the metallic liner to which two metallic end pieces are butt welded, constitutes the said mandrel/liner. Depending on the actual stresses occurring during operation the tubular section itself should contain appropriate amounts of fibres in angle plies in both a close to axial direction and hoop wise. A trap-lock joint as known from the background art is basically one or more circumferential grooves into which one or more angle ply layers of reinforcing material are bent and attached as is shown schematically in FIG. 1 of the present application. After the fibre bundles have been placed into the grooves, they may be attached and fixed into the grooves by hoop winding further fibres tangentially on top of said angle ply layers in the groove, thereby locking the said angle ply layers into place. The cross-sectional area of the load carrying angle ply layers is one of the main parameters determining the strength of the lock or interface. The above method may be further refined as proposed in EP097049 wherein is described the use of a plurality of traplock grooves. EP097049 proposes a method in which the traplocks are of varying depth in order for the load to be equally distributed in each groove, and to avoid one of the groves bearing the entire load of the fibres. GB2415727 describes an end connector at a metal to composite interface with accompanying seal for the termination of a composite riser. The traplock joint resembles to a large degree the solution as described in EP097049. Further solutions have been provided in WO2004044372 and U.S. Pat. No. 6,050,612 in which more and more advanced solutions and improvements are proposed.

US20030067167 describes a joint for the connection of fibre-reinforced composite pipes comprising a male part and a female part provided on two end parts of two pipes to be connected, characterized in that said male part and said female part have an axial modulus of elasticity which substantially increases proportionally from their free ends to their connection with said pipes.

U.S. Pat. No. 6,676,169 describes a method including the attaching of a connector having at least one trap to a segment of composite pipe comprising a plurality of filament fibers, winding the plurality of filament fibers across the end connector, wherein tension is continuously maintained on the filament fibers so that the filament fibers bridge across the at least one trap.

U.S. Pat. No. 5,702,109 provides an expandable high-pressure flexible-tube device, in particular for sealing piping in gas or oil fields, comprising two end pieces and a tubular element composed of elastomeric material comprising at least two sheets of cords wound in a helix about the longitudinal axis of said element, as a small angle of about 10 DEG to 15 DEG relative to said axis, characterized in that each sheet is stranded and comprises, in the warp direction, very strong textile cords.

U.S. Pat. No. 5,327,963 describes a coupling device adapted for attachment to an elastomeric tubular body having looped reinforcement fibers, as part of a tubular assembly. The device includes a coupling member, a stem, and a mechanism for retaining the elastomeric tubular body in a sealing engagement with the stem, and a mechanism for retaining the elastomeric tubular body in sealing engagement with the stem when connected therewith. The retaining mechanism maintains this engagement by being interposed with loops of the reinforcement fibers to limit axial movement of the reinforcement fibers and the elastomeric tubular body relative to said stem.

U.S. Pat. No. 4,755,406 describes a method for forming a composite material tube connection and a connection device comprising application thereof.

There are several problems regarding the abovementioned methods, the main problem being that these systems are unsuitable if there are large compressive or axial forces acting upon the fibers. If a large compressive force acts upon a traplock joint, the fibres may loosen from their attachments to the load carrying face of the groove, and the fibres may delaminate. The bending of the fibres into the grooves may also be problematic as the bend zone when subject to large compressive or axial forces may be a crack initiator for the fibres. The section of the stiff end piece in which the grooves are arranged may be suitably constructed so as for the bend angle of the fibres into the grooves to limit the amount of fibre bending, however this entails the widening of this section of the pipe, and solely reduces the bending stresses and does not eliminate the strains. Although fibres or fibre bundles may have very high tolerances for axial loads, they are thus often less well adapted to bending.

SUMMARY OF THE INVENTION

The present invention is a solution to at least some of the abovementioned problems and comprises an interface between a stiff end piece and a composite material, said composite material comprising fibres in which the new and characterizing features of the invention comprise said stiff end piece comprising two or more vanes protruding from a surface of said end piece, said vanes comprising two or more lateral surfaces, in which one or more resin impregnated fibre bundles or tows of said composite material are arranged for passing through one or more funnel-shaped throats formed between lateral surfaces of adjacent vanes, in which a fixing matrix material is arranged around said one or more bundles, at least in or near said funnel-shaped throats, in which said vanes are arranged for exerting counteracting transversal and axial forces on said fibres and said fixing matrix material when said interface is subject to forces.

The present invention further comprises a method for the formation of an interface between a stiff end piece and a composite material comprising fibres in a matrix material, in which the new and characterizing features of the method are characterized by the following steps, forming two or more vanes on said stiff end piece, said vanes comprising two or more lateral respective surfaces arranging one or more of said fibre bundles through at least one or more funnel-shaped throats formed between said lateral surfaces of adjacent vanes, arranging said matrix material about said one or more fibres, at least in or near said funnel-shaped throats, and curing said matrix material for the formation of a fixation between said stiff piece and said composite material.

The invention further comprises a stiff end piece for forming the joint between a composite material comprising fibres, in which the new and characterizing features of the invention comprise said stiff piece comprising two or more vanes protruding from a surface of said stiff piece, said vanes comprising two or more lateral surfaces, in which one or more fibre bundles of said composite material are arranged for being passed through one or more funnel-shaped throats formed between lateral surfaces of adjacent vanes, in which said vanes are arranged for exerting counteracting transversal and axial forces on said fibre bundles and said fixing matrix material when said interface is subject to forces.

Further advantageous embodiments of the invention are given in the hereinto attached dependent claims.

BRIEF DESCRIPTION OF THE DRAWINGS

The attached figures are intended for illustration purposes only and shall not be construed in any way that limits the invention, which shall only be limited by the attached claims.

FIG. 9 illustrates an embodiment of the interface according to the invention in which a series of pre-moulded potting inserts may be arranged between the vanes. FIG. 9a is a perspective view of a sector of a metal/composite interface according to the invention, in which a pre-moulded potting has been used. FIG. 9b illustrates a fiber bundle path passing through a channel through a pre-moulded potting insert during the winding process and partially filled with fixing matrix material, the fibre bundle returning about a collar comprising extending collar rods arranged about one end of the stiff end piece. FIG. 9c illustrates an inserted pre-moulded potting insert between two vanes, FIG. 9d illustrates the step of being filled with matrix material, and FIG. 9e illustrates the filler material and the collar in place.

FIG. 10 illustrates a sector of an embodiment of the interface's stiff piece for use not as a pipe flange, but rather for use as a ring-shaped nozzle for forming the exit portion from a pipe-formed or tank-formed composite shell, so as for enabling the passage of gases with high velocity and under high pressure and temperature.

DETAILED DESCRIPTION OF EXEMPLARY EMBODIMENTS

Figure 1:
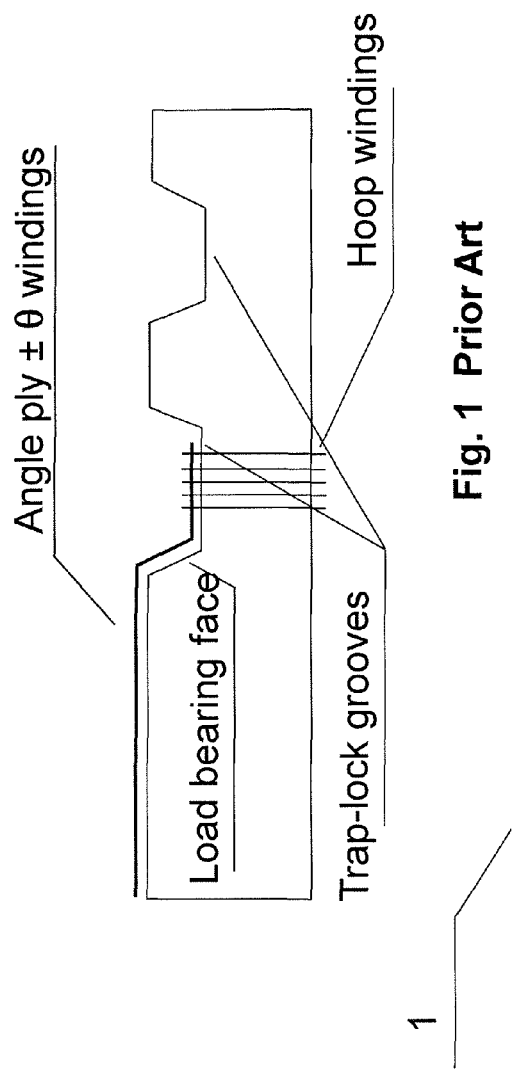
FIG. 1 illustrates schematically the background art, in which is shown a system for fixing a composite material comprising fibres to a stiff end piece. Fibre bundles with angle ply orientation are passed into so-called trap locks and are fixed into place by means of hoop windings. The main proportion of the forces acting on said fibre bundles are exerted from the load bearing faces of the trap lock joints.
Figure 2:
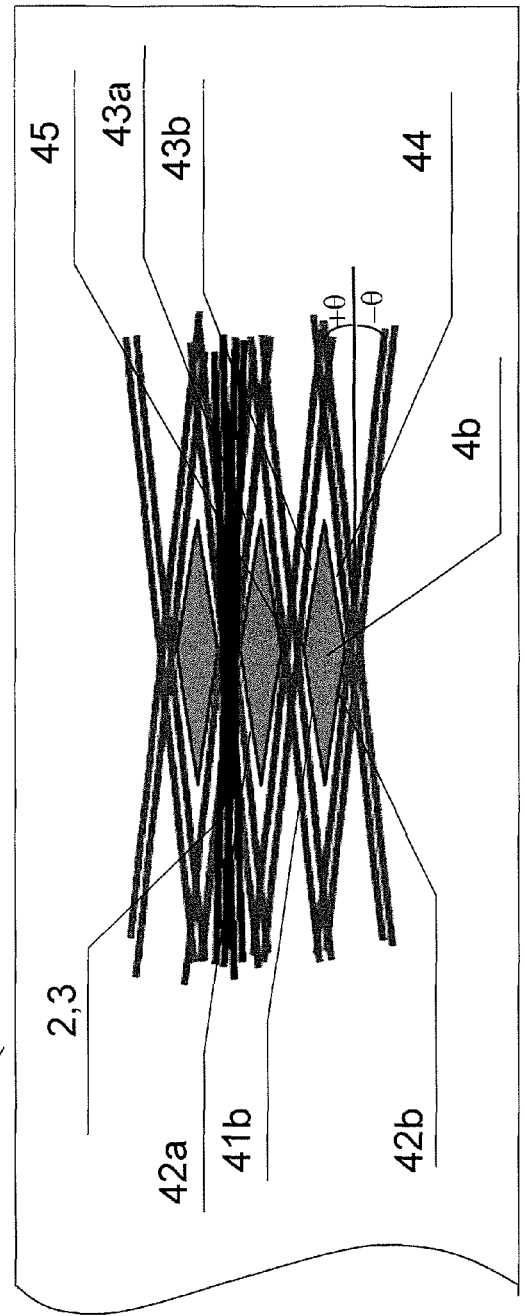
FIG. 2 illustrates schematically the winding arrangement according to the invention. A plurality of vanes (4) comprising lateral surfaces (41, 42, 43, 44) are arranged on a stiff end piece (1).

Referring now to the figures, the present invention discloses an interface between a stiff end piece (1) and a composite material (2) said composite material (2) comprising fibres (3). Said stiff end piece (1) comprises two or more vanes (4a, 4b, ...) protruding from a surface of said stiff piece (1) and said vanes (4) comprise two or more lateral surfaces (41, 42, 43, 44). One or more fibres (3) of said composite material (2) are arranged for passing through one or more funnel-shaped throats (45) formed between lateral surfaces (41a, 43a, 41b, 43b, ...) of adjacent vanes (4a, 4b, ...) and a fixing matrix material (7) is arranged around said one or more fibres (3), at least in or near said funnel-shaped throats (45). Said fixing material (7) may preferably be a curable material such as epoxy resin, or any other suitable form of matrix material. Said vanes (4) are thus arranged for exerting counteracting transversal and axial forces on said fibres (3) and said fixing matrix material (7) when said interface is subject to forces. As the fibres or fibre bundles (3) are capable of withstanding large axial loads, this arrangement is significantly more stable than the arrangements provided by the background art. As the fibres or fibre bundles (3) are not bent into the grooves as shown in the background art, no bending which may initiate crack formation is performed. Although fibres or fibre bundles (3) may have very high tolerances to axial loads, they are as described above often less well adapted to bending.

The cross-sectional area of the load carrying angle ply layers is one of the main parameters determining the strength of the lock or interface in the trap lock joints as described in the background art. The present invention allows for a much stronger attachment as there is no such limiting factor comprised in the joint, and the strength-determining factor of the interface is limited solely by the strength and amount of fibers (3) present, and the shear resistance between the load carrying vanes (4a, 4b, . . . ) and the bulge (8) from which they protrude.

In a particularly preferred embodiment according to the invention, the stiff end piece (1) is a pipe-shaped tubular and said interface will thus be an interface between a composite material (2) also being pipe-shaped. This arrangement allows for the formation of an interface between a pipe section comprising a composite material (2) and a stiff end piece (1) shaped as a pipe. When joining pipe-sections to each other when forming for instance a riser for use in petroleum exploration and exploitation, it is necessary to provide metallic joints, and when using composite materials (2) either for the reinforcement of said pipes, or in circumstances in which said pipes comprise mainly composite materials, there is need of robust joints between said end pieces (1) and said composite materials (2).

Further applications of the invention may also comprise the use of fixing composite materials (2) comprised in wing blade sections of windmills to the metallic stiff end piece (1) at the root of the blade. The axial forces exerted on such wings may be very large and necessitates a very strong joint between the composite wing material and the stiff end piece (1). Other applications may include tension legs, spars, containers and other pieces in which there is need of a joint between a stiff end piece (1) and a composite material (2) as will be evident to a person skilled in the art.

Figure 3:
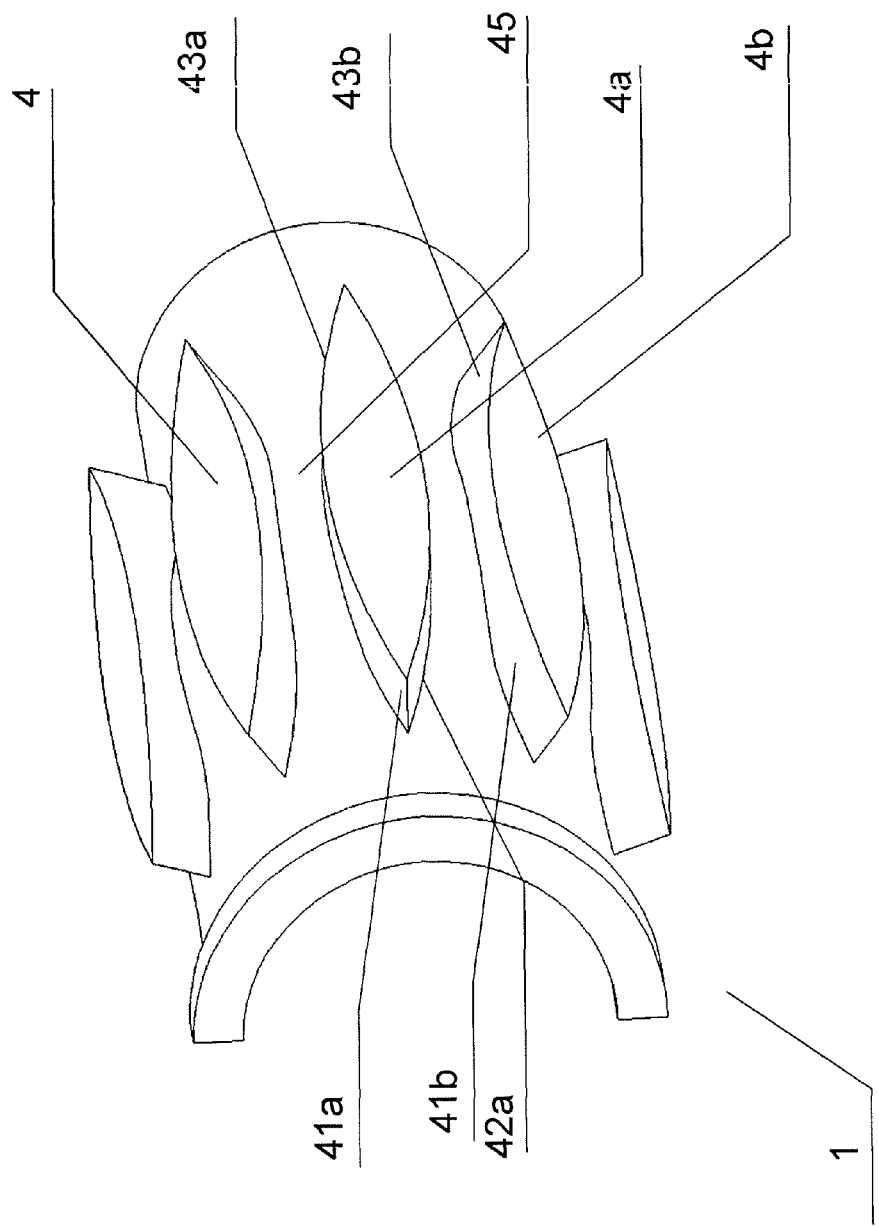
FIG. 3 describes an isometric view of an embodiment according to the invention, in which the stiff end piece (1) is formed as a pipe, and in which may be seen said vanes (4) and the tunnel shaped funnels (45) between said vanes (4).
Figure 4:
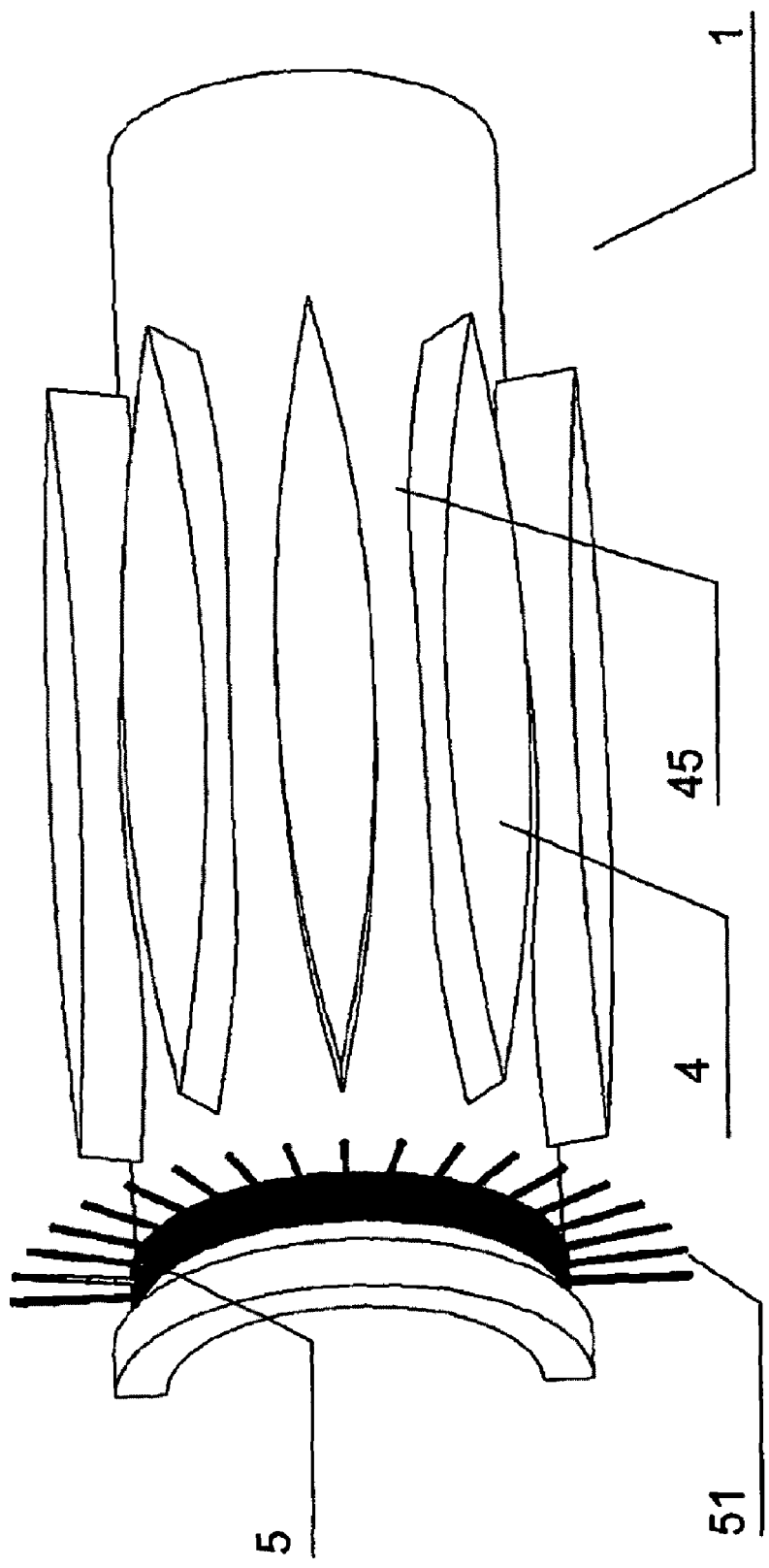
FIG. 4 describes an isometric view of an embodiment according to the invention mainly corresponding to FIG. 3, but in which also may be seen a collar (5) comprising extending collar rods (51) arranged at one end of the stiff end piece (1).

In an embodiment according to the invention, said vanes (4) may have a rhomboid or semi-rhomboid geometrical shape as shown in FIGS. 3 and 4. The geometry of the end piece (1) and semi-rhomboids vanes (4) are adapted for filament-winding of said fibres (3) of the composite material (2). Composite materials (2) are typically filament wound in a ±θ helical angle pattern about the pieces to be reinforced. The helical winding angle θ should be given a value lesser than the semi angle of the acute angle of the tip of the semi-rhomboid vanes (4) in order for the fibres (3) not to be in contact with the ends of the rhomboid vanes (4). Contact between the ends of said vanes (4) and said fibres (3) should be avoided to ensure that the fibres (3) are not broken by said vanes (4) when said fibres (3) are subjected to forces causing them to move with respect to said vanes (4).

It is also possible to use a fibre placement pattern that in addition to the ±θ helix angles uses a fibre orientation in the axial direction. One such winding pattern can consist of one fibre layer of +θ helix angle, a layer of 0 angle, and a layer with −θ helix angle. Thereafter one or several hoop windings may be added. The actual combination of winding angles and the relative amount of fibres (3) in each direction depends on the loading situation, in effect, internal pressure versus axial load within the pipe.

In order for facilitating the winding of the fibres (3) a collar (5) comprising multiple elongated radially extending rods (51) may be arranged at the outer end of the stiff end piece (1), and in which each fibre (3) or fibre bundle is passed around one or more of the rods (51) and back between the vanes (4). This process may be performed as many times as is desired or is permitted by the length of each fibre (3) or fibre bundle. After the filament-winding scheme is completed, the fibres (3) are cut from said collar (5), and said collar (5) removed. FIG. 4 shows an end piece according to the invention with the collar (5) in place.

Figure 5:
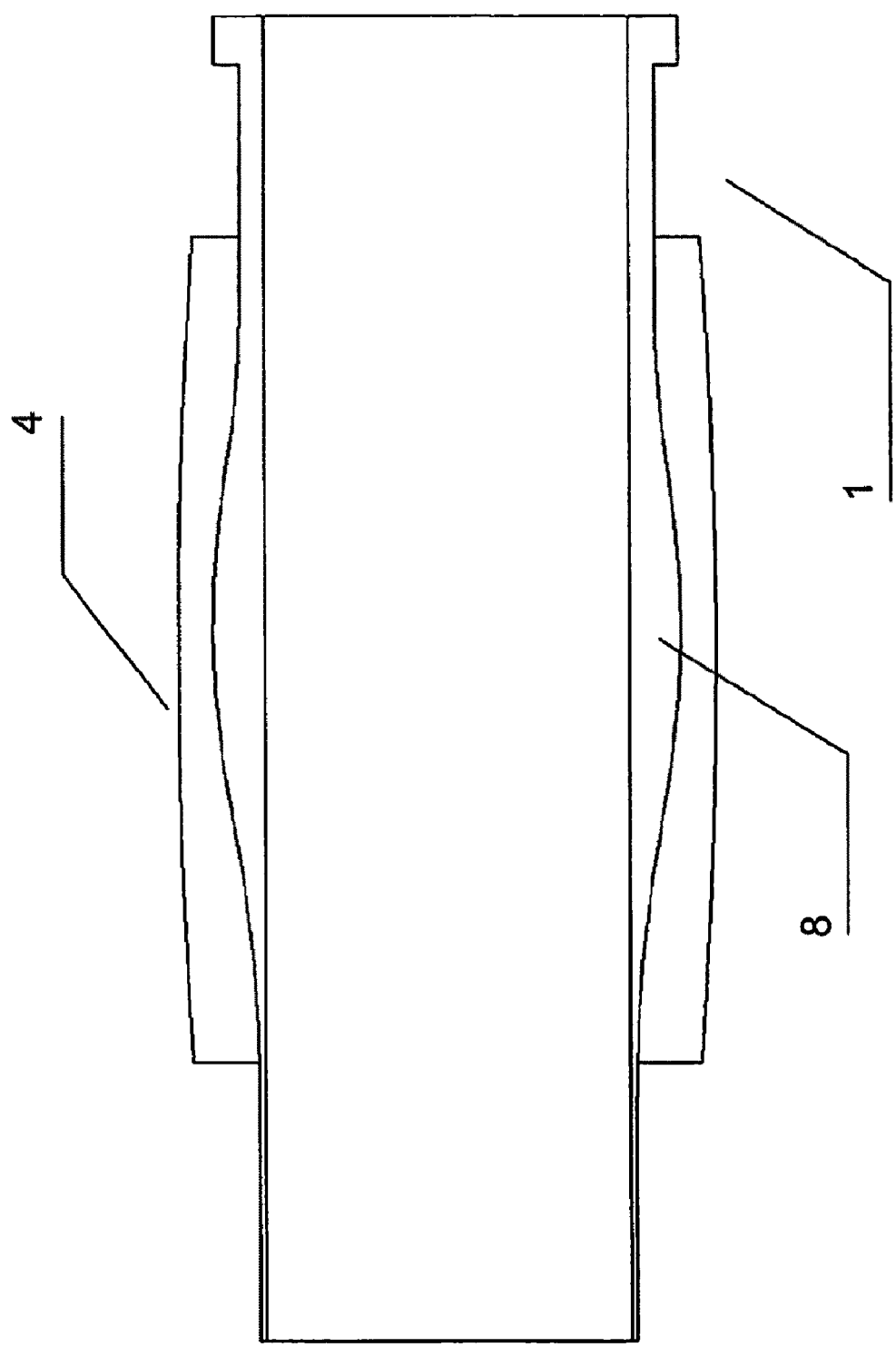
FIG. 5 describes a cross-section of a stiff end-piece (1) according to the invention in which is shown said vanes (4) arranged on a bulge (8) formed on said stiff end piece (1).
Figure 6:
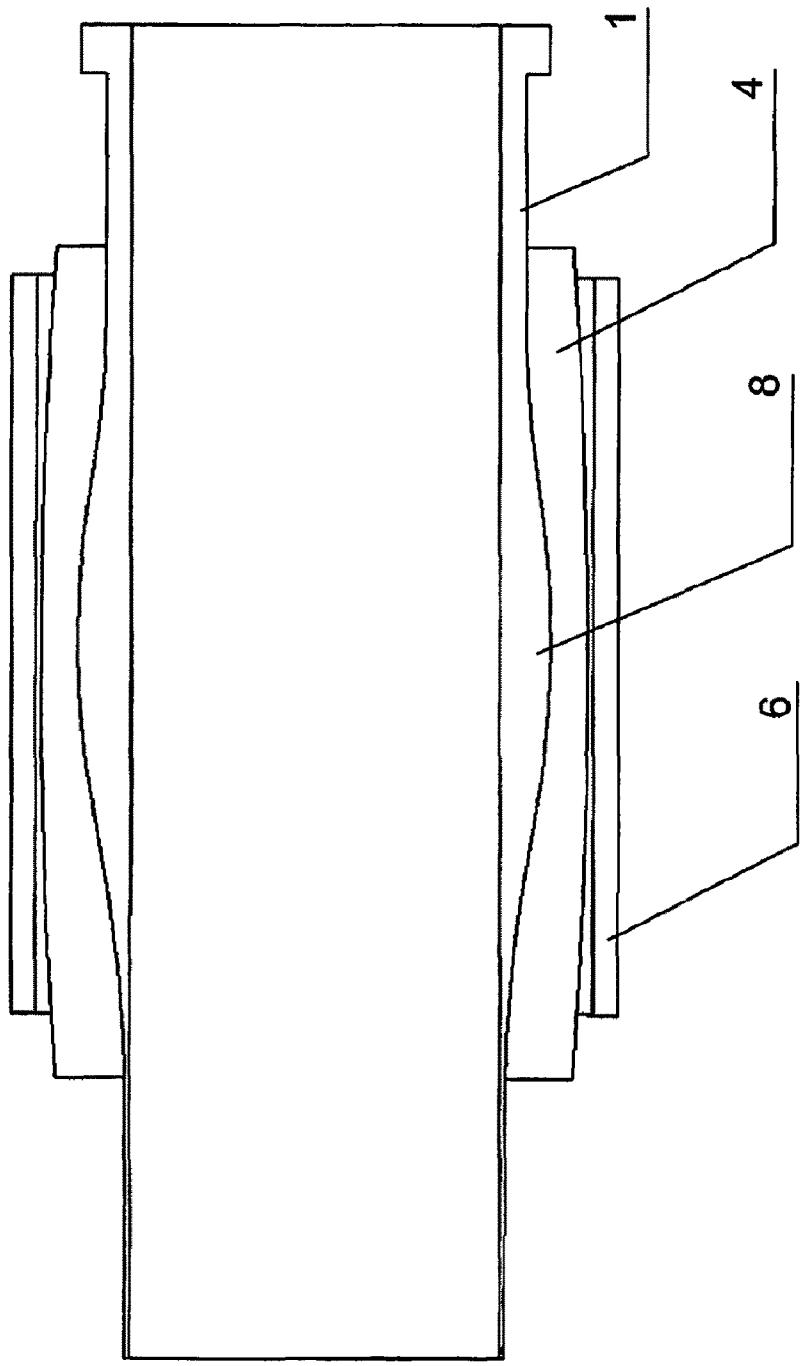
FIG. 6 describes mainly the same cross-section as in FIG. 5 but in which an annular (6) is arranged at least partially enclosing said vanes (4). As in FIG. 5, said vanes (4) are arranged on the bulge (8) formed on said stiff end piece (1).
Figure 7:
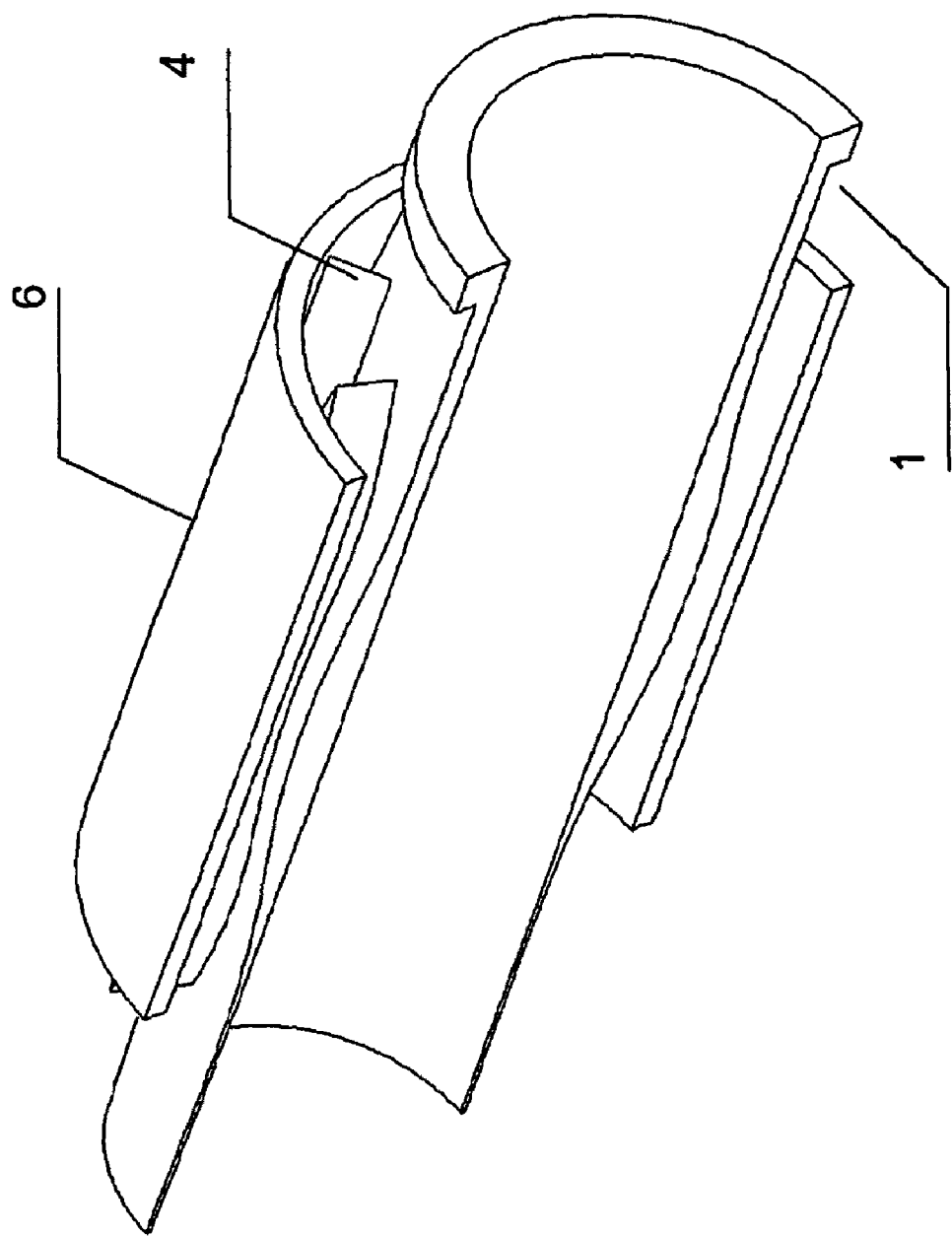
FIG. 7 describes an isometric view of an embodiment of the invention, in which may be seen said annular (6) arranged encapsulating said vanes (4) arranged on said end-piece (1).

In a further preferred embodiment of the invention, when the filament winding scheme is completed an annular (6) with a slight conical internal shape axially pressed onto the top of the vanes (4) as shown in FIG. 5. In order to achieve a void free connection between the composite (2) and the metal part a vacuum infusion operation is performed. The end assembly is wrapped with a pre-shaped elastic collar that covers both sides of the flat surfaces of the annular (6) and extending typically 100 mm on each side and thereby forms a reasonably good vacuum tight seal. A vacuum is applied and a fixing material (7), preferably of the same composition as used in the filament-winding process, is inserted into the annular (6) thus filling the entire annular (6). In a preferred embodiment of the invention, the elastomeric collar may be transparent in order for the filling process to be supervised. The annular (6) provides an additional reinforcement of the interface.

The vanes (4) may in an advantageous embodiment according to the invention be arranged on a bulge (8) on said stiff piece (1), said bulge being even more preferably bulb shaped. When said annular (6) is arranged onto the top of said vanes (4) as shown in FIG. 5, the bulge will provide an additional constriction in the radial direction for the fiber (3) and fixing material (7). This constriction in the radial direction will furnish additional resistance to forces on the joint in the longitudinal direction rendering the interface stronger.

The so-formed connection between the composite (2) and the stiff-end piece (1) may now be considered to form a two-way conical wedge lock. When subjected to axial tension the fibres (3) are pulled axially and as they are displaced relative to the vanes (4), the fibres (3) are squeezed in the transverse direction and the transversal pressure increases as rods with unidirectional fibres (3) in a conical potted seat. With regard to compression, the other end of the wedge lock will function in the same manner, thus ensuring that the connection is maintained even during compression of the connection. Although compression of for instance pipes is quite rare, this may occur for instance when a drilling vessel heaves and the riser is heave compensated inadequately. However, for other applications such as wind turbine blades, compressive stresses are present at the rear side of the blade.

Figure 8:
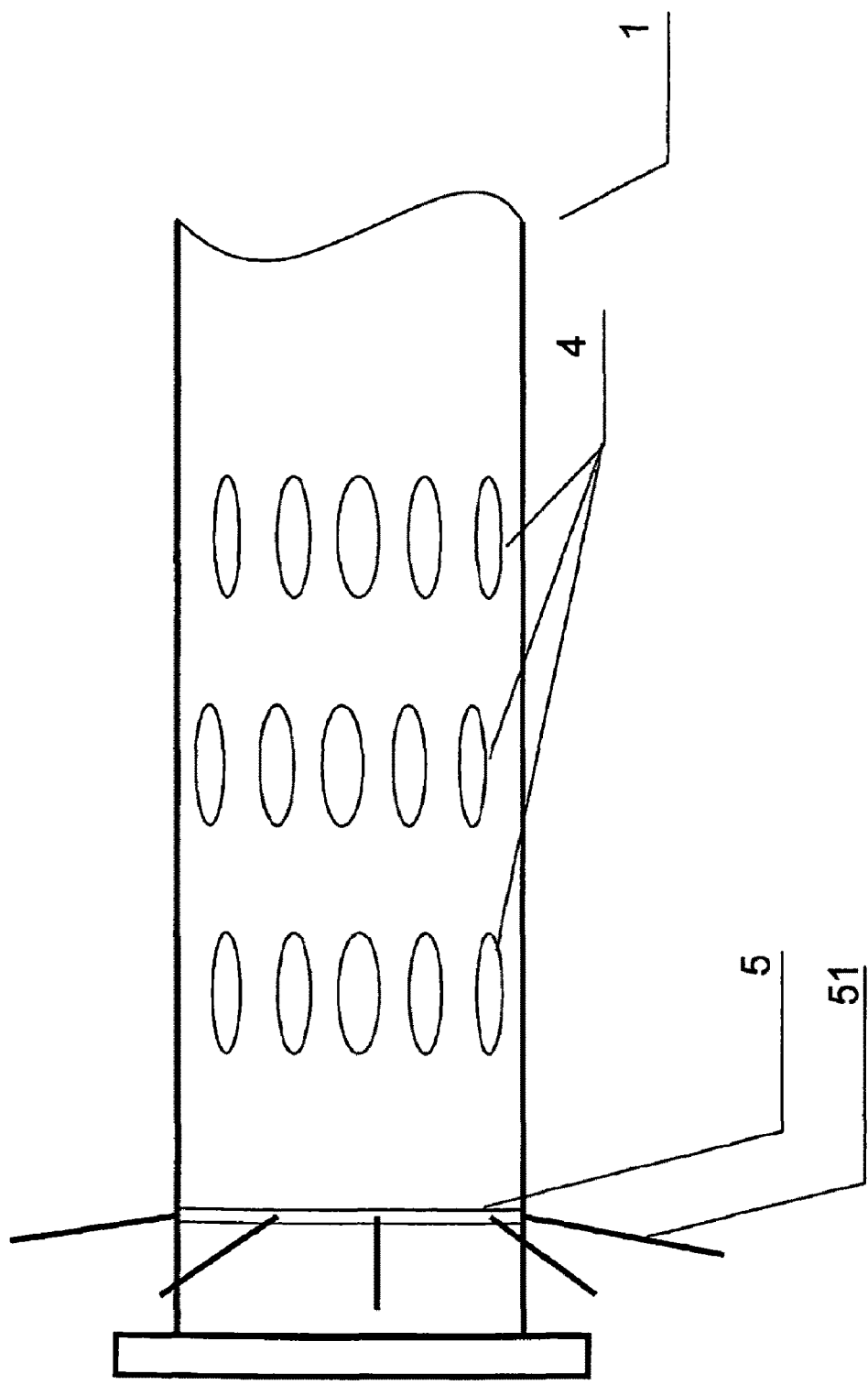
FIG. 8 describes a schematic view of an alternative embodiment according to the invention in which is shown a plurality of rows of vanes (4) arranged on said stiff end piece (1), and in which is shown said collar (5) comprising said extending collar rods (51).

In a separate preferred embodiment of the invention, a plurality of said vanes (4) are arranged successively such that said fibres (3) pass through two or more spaces between four or more successive vanes (4) arranged longitudinally in said stiff end piece (1), see FIG. 8. This arrangement allows for the additional fixing of fibres (3) into place as the fibres (3) are compressed through a plurality of throat shape funnels (45) along the longitudinal direction of the fibres (3). As will be evident to a person skilled in the art, the annular (6) may be arranged above some or all of said successive vanes (4) such that the reinforcement of the joints is continuous in the axial direction of the joint.

In a further preferred embodiment of the invention, the end piece (1) may be welded or other wise fixed to a pre-formed pipe, which is to be reinforced by a composite material by means of a filament-winding scheme. Said pipe may be intended for use for instance in petroleum exploration and exploitation.

The end piece geometry according to the invention may be manufactured by using a numerically controlled milling machine or cutter or by any other means adapted to the purpose as will be evident to a person skilled in the art.

In a further advantageous embodiment of the invention, a suitable release agent may be provided onto the stiff piece (1) prior to the fibre winding. The release agent is arranged for reducing stress concentrations in the fiber or fiber bundle (3) arrangement and thus reduce the potential of fibre (3) failure. The release agent may comprise any suitable release agent compound as evident to a person skilled in the art.

In a further advantageous embodiment of the invention, a thin film comprising an elastomeric compound may be arranged onto the stiff piece (1) prior to filament-winding.

The purpose of the application of said thin elastomeric film is, as for the application of said release agent to reduce stress concentrations in the fiber or fiber bundle (3) arrangement after filament-winding, and thus reduce the potential of fiber failure. The thin elastomeric film will be deformed by potential shear forces acting between the fibre (3)/fixing material arrangement and the stiff end piece (1). Any suitable elastomeric material may be employed, such as Nitril Rubber (NBR) or HNBR (Hydrogenated Nitrile Rubber) or any other suitable elastomeric compound.

In a further advantageous embodiment of the invention, the two above methods may be combined, in which firstly a thin film of a suitable elastomeric compound is applied to the stiff end piece (1), and secondly said release agent is applied onto said thin elastomeric film for the increased reduction of potential tension in the fiber (3) arrangement.

In an embodiment of the interface according to the invention, a series of pre-moulded potting inserts (46) may be arranged between the vanes (4a, 4b, . . . ) before the winding process commences, please see FIG. 9, and particularly FIG. 9c. The pre-moulded potting inserts (46) have an external surface (47) generally tapering off from a broad cross-section to a narrow cross-section corresponding to the internal shape said funnel-shaped throats (45) and generally arranged for filling a part of said funnel-shaped throats (45) against a pair of oppositely arranged lateral surfaces (41, 42), please see FIG. 9a and FIG. 9c, and having a central channel (48) for receiving said fibres (3) indicated as a massive cylindrical bundle in FIG. 9b, and for being filled with said fixing material (7), please ref. FIG. 9d.

Such pre-moulding potting inserts (46) may be provided with varying mechanical properties to improve the distribution of forces when the interface between the stiff piece (1) and the composite material (2) is axially loaded. This may better control the progression of plastic deformation under high loads. A further advantage of the pre-moulded potting inserts is that their use may simplify the production process during fibre winding, as there will be a reduced or no need for injection or infusion after the winding. The pre-moulded potting insert may easily be mass produced at low cost.

FIG. 10 illustrates a sector of an embodiment of the interface's stiff piece (1) for use not as a pipe flange, but rather for use as a ring-shaped nozzle for forming the exit portion from a pipe-formed or tank-formed composite shell, so as for enabling the passage of gases with high velocity and under high pressure and temperature.

The invention claimed is:

1. An interface between a pipe shaped stiff piece (1) and a composite material (2), said composite material (2) comprising fibers (3) in a fixing matrix material (7),
characterized by,
   said stiff piece (1) comprising two or more axially orientated vanes (4a, 4b) protruding from a surface of said stiff piece (1),
   said vanes (4a, 4b) have a generally rhomboid geometrical shape,
   each said vanes (4a, 4b) comprising two or more lateral surfaces (41, 42, 43, 44) forming symmetrical positive and negative angles (±θ) relative to an axis of said stiff piece (1)
   in which two or more fibers (3) of said composite material (2) are arranged for passing under opposite positive and negative ply angles through one or more funnel-shaped throats (45) formed between lateral surfaces (41a, 43a, 41b, 43b) of adjacent vanes (4a, 4b),
   in which said fixing matrix material (7) is arranged and cured around said fibers (3), at least in or near said funnel-shaped throats (45),
   in which said vanes (4) are arranged for exerting counteracting transversal and axial forces on said fibers (3) and said fixing matrix material (7) when said interface is subject to axial forces.

2. The interface according to claim 1 in which said composite material (2) and said stiff piece (1) form sections of a pipe.

3. The interface according to claim 2 in which an annular sleeve (6) is arranged for encapsulating a desired section about said vanes (4), said fibers (3) and said filling material (7), so as for sealing said composite material (2) between said vanes (4).

4. The interface according to claim 1 in which said vanes (4) are arranged on a bulge (8) on said stiff piece (1).

5. The interface according to claim 4 in which said bulge (8) is bulb-shaped.

6. The interface according to claim 1 in which a plurality of said vanes (4) are arranged successively such that said fibers (3) pass through two or more spaces between four or more successive vanes (4) arranged longitudinally in said stiff end piece (1).

7. The interface according to claim 1, comprising a pre-molded potting insert (46) having an external surface (47) generally tapering off from a broad cross-section to a narrow cross-section corresponding to the internal shape said funnel-shaped throats (45) and generally arranged for filling a part of said funnel-shaped throats (45) against a pair of oppositely arranged lateral surfaces (41, 42), and having a central channel (48) for receiving said fibers (3) and for being filled with said fixing material (7).

8. The interface according to claim 1, in which said stiff piece (1) is a ring-shaped nozzle for forming the exit portion from a pipe-formed or tank-formed composite shell, so as for enabling the passage of gases with high velocity.

9. A method for the formation of an interface between a pipe shaped stiff piece (1) and a composite material (2) comprising fibers (3) in a matrix material (7),
characterized by the following steps,
   forming two or more protruding axially orientated, generally rhomboid geometrical shaped vanes (4a,4b) on said stiff piece (1), said vanes (4a,4b) comprising two or more lateral respective surfaces (41a, 41b, 42a, 42b, 43a, 43b 44a, 44b),
   arranging two or more of said fibers (3), having opposite positive and negative ply angles relative to an axis of said stiff piece (1), through at least one or more funnel-shaped throats (45) formed between said lateral surfaces (41a, 43a, 41b, 43b) of adjacent vanes (4a, 4b),
   arranging said matrix material (7) about said fibers (3), at least in or near said funnel-shaped throats (45), and
   curing said matrix material (7) for the formation of a fixation between said stiff piece (1) and said composite material (2),
   said fixation arranged for exerting counteracting transversal and axial forces on said fibers (3) when said interface is subject to axial forces.

10. The method according to claim 9, in which said stiff piece (1) is formed as an end section of a pipe.

11. The method according to claim 10 in which an annular sleeve (6) is arranged encapsulating over a section about said vanes (4) so as for sealing said fibers (3) and said filling material (7), and fixing said sleeve (6) into place.

12. The method according to claim 10, in which said fibers (3) are wound about extending collar rods (51) on a collar (5)

arranged nearer to the end of said stiff end piece (1), and in which said fibers (3) are turned or wound around said extending collar rods (51) before the arranging of fixing material (7).

13. The method according to claim 9 in which a plurality of said vanes (4) are such that said fibers (3) pass through two or more spaces between four or more successively arranged vanes (4) in the longitudinal of said end piece.

14. The method according to claim 9, in which said end piece (1) may be welded or other wise fixed to a pre-formed pipe whereby said combined end piece (1) and said pre-formed pipe are reinforced by said composite material comprising said fibers (3) by means of a filament-winding scheme.

15. The method according to claim 9 in which a surface treatment of said stiff end piece (1) by a release agent is performed before the arranging of one or more of said fibers (3) through said at least one or more funnel-shaped throats (45) formed between said lateral surfaces (41*a*, 43*a*, 41*b*, 43*b*) of adjacent vanes (4*a*, 4*b*).

16. The stiff piece according to claim 15, in which said stiff piece (1) is pipe shaped.

17. The stiff piece according to claim 16 in which said bulge (8) is bulb-shaped.

18. The stiff piece according to claim 15 in which said vanes (4) are arranged on a bulge (8) on said stiff piece (1).

19. The stiff piece according to claim 15 in which a plurality of said vanes (4) are arranged successively such that said fibers (3) pass through two or more spaces between four or more successive vanes (4) arranged longitudinally in said stiff end piece (1).

20. The method according to claim 9 in which a surface treatment of said stiff end piece (1) by a thin film comprising an elastomeric compound is performed before the arranging of one or more of said fibers (3) through said at least one or more funnel-shaped throats (45) formed between said lateral surfaces (41*a*, 43*a*, 41*b*, 43*b*) of adjacent vanes (4*a*, 4*b*).

21. The stiff piece according to claim 20, in which said stiff piece (1) is arranged for being welded or otherwise fixed onto a pipe section, in which said pipe section is arranged for being reinforced by said fiber (3) containing composite material (2).

22. The method according to claim 9 in which in which a surface treatment of said stiff end piece (1) by a thin film comprising an elastomeric compound is performed before a subsequent surface treatment of said stiff end piece (1) by a release agent is performed before the arranging of one or more of said fibers (3) through said at least one or more funnel-shaped throats (45) formed between said lateral surfaces (41*a*, 43*a*, 41*b*, 43*b*) of adjacent vanes (4*a*, 4*b*).

23. A pipe shaped stiff piece (1) for forming a joint between a composite material (2) comprising fibers (3), characterized by said stiff piece (1) comprising two or more axially orientated, generally rhomboid geometrical shaped vanes (4*a*, 4*b*) protruding from a surface of said stiff piece (1), said vanes (4*a*, 4*b*) comprising two or more lateral surfaces (41, 42, 43, 44) forming symmetrical positive and negative angles (±θ) relative to an axis of said stiff piece (1), one or more funnel-shaped throats (45) formed between lateral surfaces (41*a*, 43*a*, 41*b*, 43*b*) of adjacent vanes (4*a*, 4*b*), in which two or more fibers (3) having opposite positive and negative ply angles relative to an axis of said stiff piece (1) of said composite material (2) shall be passed through and be enveloped in a cured matrix material (7) and, in which said vanes (4) are arranged for exerting counteracting transversal and axial forces on said fibers (3) and said cured matrix material (7) when said interface is subject to forces.

\* \* \* \* \*